United States Patent
Urbon et al.

(10) Patent No.: US 6,911,647 B2
(45) Date of Patent: Jun. 28, 2005

(54) SCANLINE ALIGNMENT SENSORS

(75) Inventors: Michael P. Urbon, Churchville, NY (US); John L. Bair, Livonia, NY (US)

(73) Assignee: Eastman Kodak Company, Rochester, NY (US)

( * ) Notice: Subject to any disclaimer, the term of this patent is extended or adjusted under 35 U.S.C. 154(b) by 4 days.

(21) Appl. No.: 10/742,222

(22) Filed: Dec. 19, 2003

(65) Prior Publication Data

US 2004/0164236 A1 Aug. 26, 2004

Related U.S. Application Data

(60) Provisional application No. 60/444,014, filed on Jan. 31, 2003.

(51) Int. Cl.[7] .............................. H01J 3/14; G02B 26/08
(52) U.S. Cl. ........................ 250/234; 250/583; 358/474; 359/212
(58) Field of Search ................................. 250/234–236, 250/226, 580–583; 358/474, 480, 481, 509, 514; 359/201, 202, 212, 223

(56) References Cited

U.S. PATENT DOCUMENTS 5,691,535 A * 11/1997 Boutet ......................... 250/234
2004/0150863 A1 * 8/2004 Newman ...................... 359/212

\* cited by examiner

*Primary Examiner*—Kevin Pyo
(74) *Attorney, Agent, or Firm*—Susan L. Parulski

(57) ABSTRACT

An optical imaging system comprising: an optical assembly for producing a laser beam scanline at an imaging region; first and second photodetectors located at the imaging region at the first and second ends of a produced laser beam scanline; and a visual indicator system coupled to the first and second photodetectors to visually indicate detection of the first and second ends of the laser beam scanline.

9 Claims, 7 Drawing Sheets

SCANLINE ALIGNMENT SENSORS

CROSS REFERENCE TO RELATED APPLICATIONS

This is a 111A application of Provisional Application Ser. No. 60/444,014, filed 31, Jan. 2003.

FIELD OF THE INVENTION

This invention relates in general to optical imaging systems and more particularly to visual aids for facilitating alignment of a laser beam scanline at an imaging region.

BACKGROUND OF THE INVENTION

In a Computed Radiography (CR) reader, the laser beam is scanned in a scanline over the surface of a storage phosphor screen by a reciprocating galvanometer mirror or polygon rotating mirror in a fast scan direction while the screen is transported under the scanline in a slow scan direction. To make the CR reader compact and manufacturable, a final fold mirror is placed in the optical path between an F-theta lens and the phosphor screen. The fold mirror introduces three degrees of freedom into the optical system. A coordinate system on the mirror has an x-axis in the plane of the mirror along the fast scan dimension of the mirror, a y-axis in the plane of the mirror perpendicular to the x-axis and a z-axis normal to the mirror surface.

The z-axis degree of freedom allows the path length of the optical system to be adjusted by translating the mirror along that axis. Typically, the depth of focus of the laser is not critical and there is no need to adjust this degree of freedom.

The other two degrees of freedom are rotations about the x and y axes which allow the scanline to be positioned on the phosphor surface. It is required to rotate the scanline perpendicular to the slow scan transport direction to eliminate a parallelogram image distortion. It is also required to translate the scanline to a particular position where the laser beam is not obstructed and the phosphor screen is well controlled for height.

The alignment of the scanline for rotation and translation in a known CR reader was done visually by an operator observing the scanline while adjusting the two axes. This required safety hardware and procedures to be followed to ensure laser safety in the presence of the exposed beam. Also the process resulted in significant residual misalignment since the adjustment process was a subjective operator dependent alignment.

SUMMARY OF THE INVENTION

According to the invention, a photodiode is placed behind a platen slot at each end of the scanline and the photodiode to connected to LED indicators. Preferably, each photodiode is coupled to an LED of a different color. A benefit is that the adjustment of the fold mirror can be made without direct observation of the beam, eliminating laser safety hazard and providing a repeatable and known alignment precision since the beam is aligned to precision slots in the machine.

According to a feature of the present invention, there is provided one multicolored LED is used instead of two single color LED's Another feature of the invention is to place the slot in a relieved area of the scan platen so the storage phosphor that slides across the scan platen does not contact the slot, otherwise, the slot tends to become filled with debris.

ADVANTAGEOUS EFFECT OF THE INVENTION

The invention has the following advantages.

1. Adjustment of the fold mirror can be made without direct observation of the laser beam, eliminating laser safety hazard and providing a repeatable and known alignment precision since the beam is aligned to precision slots in the CR reader.

2. The alignment technique is simple, efficient and economical.

DETAILED DESCRIPTION OF THE INVENTION

Figure 1:
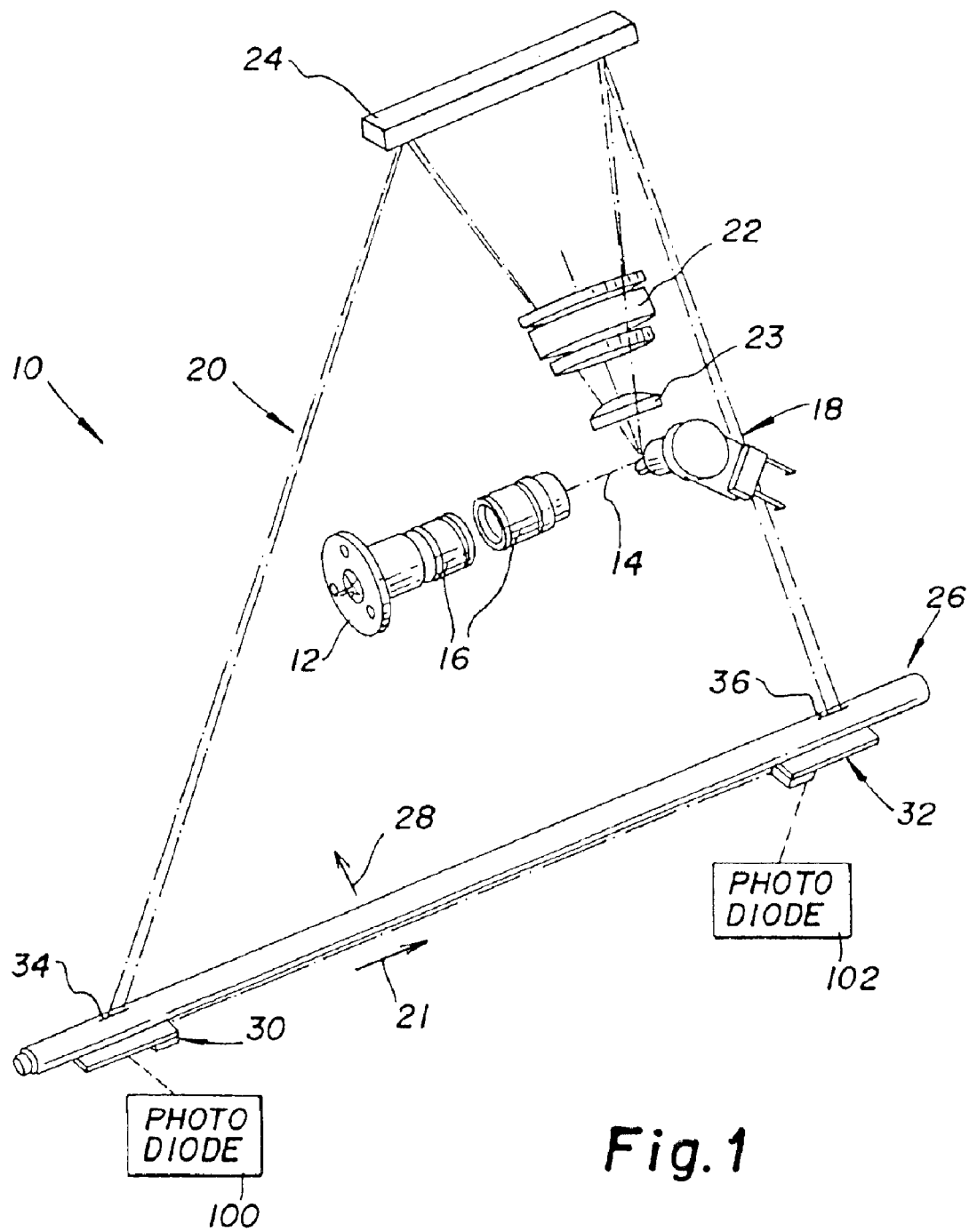
FIG. 1 is a diagrammatic view which shows the overall layout of the CR optical system with the principle components.
Figure 2:
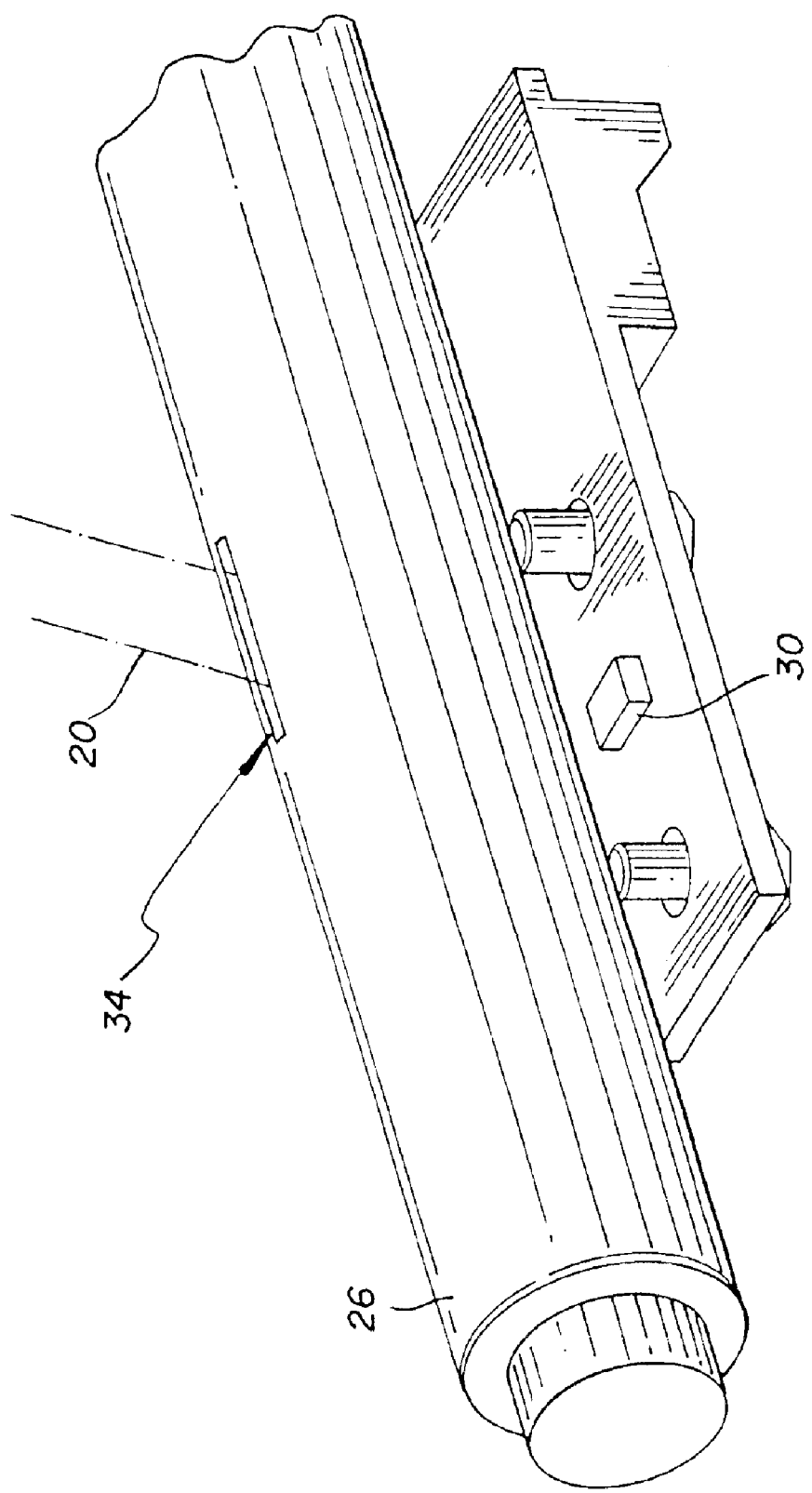
FIG. 2 is a diagrammatic view which shows a close-up view of the slit in the scan platen with the sensor board.
Figure 3:
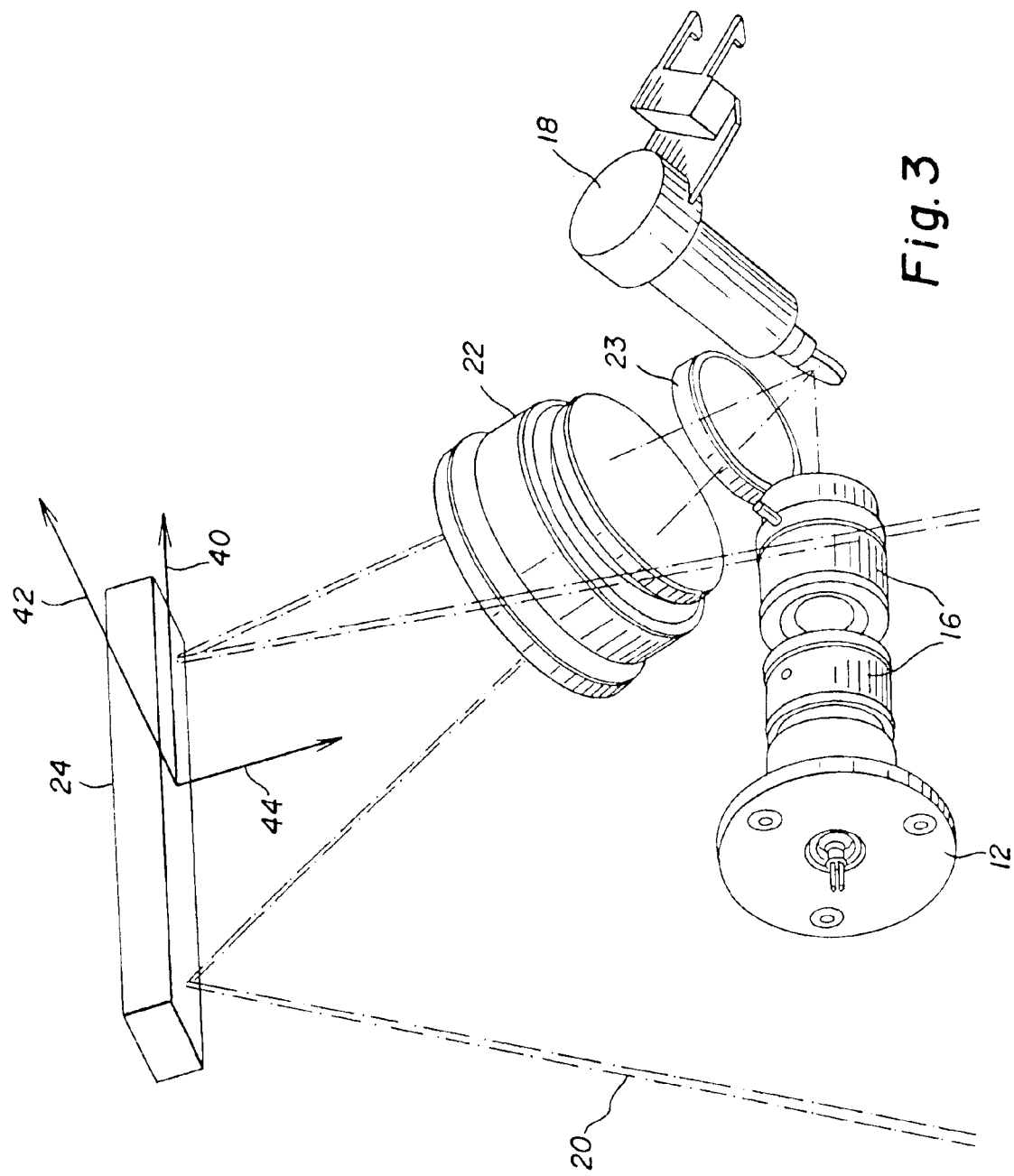
FIG. 3 is a diagrammatic view which shows a close-up view of the final fold mirror, the lenses and the galvonometer.

Referring now to FIGS. 1–3, there is shown a laser scanning optical system for use in a computed radiography scanning system (or any other similar scanning system) incorporating an embodiment of the present invention. As shown, laser scanning optical system 10 includes a laser diode 12 which produces a laser beam 14 shaped by shaper lens elements 16. A reciprocating galvonometer mirror 18 produces a laser beam scan line 20 in a fast scan direction 21 shaped by F-theta lens 22 and lens 23. A final fold mirror 24 directs scan line 20 onto scan platen 26. Scan platen 26 establishes an imaging region for a storage phosphor transported in a slow scan direction 28 over platen 26. Sensors 30 and 32 are located at the ends of scan line 20 and are activated by laser beam 14 passing through respective slots 34 and 36 in platen 26. A rotating multifaceted polygon mirror can also be used in place of the reciprocating galvonometer mirror 18 to produce laser beam scan line 20. According to the invention sensor 30 is coupled to LED 100 and sensor 32 is coupled to LED 102. Preferrably, LEDs 100, 102 emit a different colors. When mirror 34 is being adjusted, direct observation of the laser beam is unnecessary. Thus, a laser safety hazard is eliminated and there is provided a repeatable and known alignment precision since the laser beam is aligned to precision slots in the scan platen. LEDs 100, 102 may be located at any convenient location.

FIG. 3 illustrates the three axes along which mirror 24 can be adjusted to properly align the scan line 20 on platen 26. These axes are x-axis 40, y-axis 42, z-axis 44. X-axis 40 is along the fast scan dimension of mirror 24, y-axis 42 is in the plane of the mirror perpendicular to the x-axis 40, and z-axis 44 is normal to the surface of mirror 24 which allows the path length of the optical system to be adjusted by translating mirror 24 along it. Adjustment of mirror 24 along axis 40 and 42 allow the scan line 20 to be positioned on platen 26 and a storage phosphor plate moved over platen 26.

Figure 4:
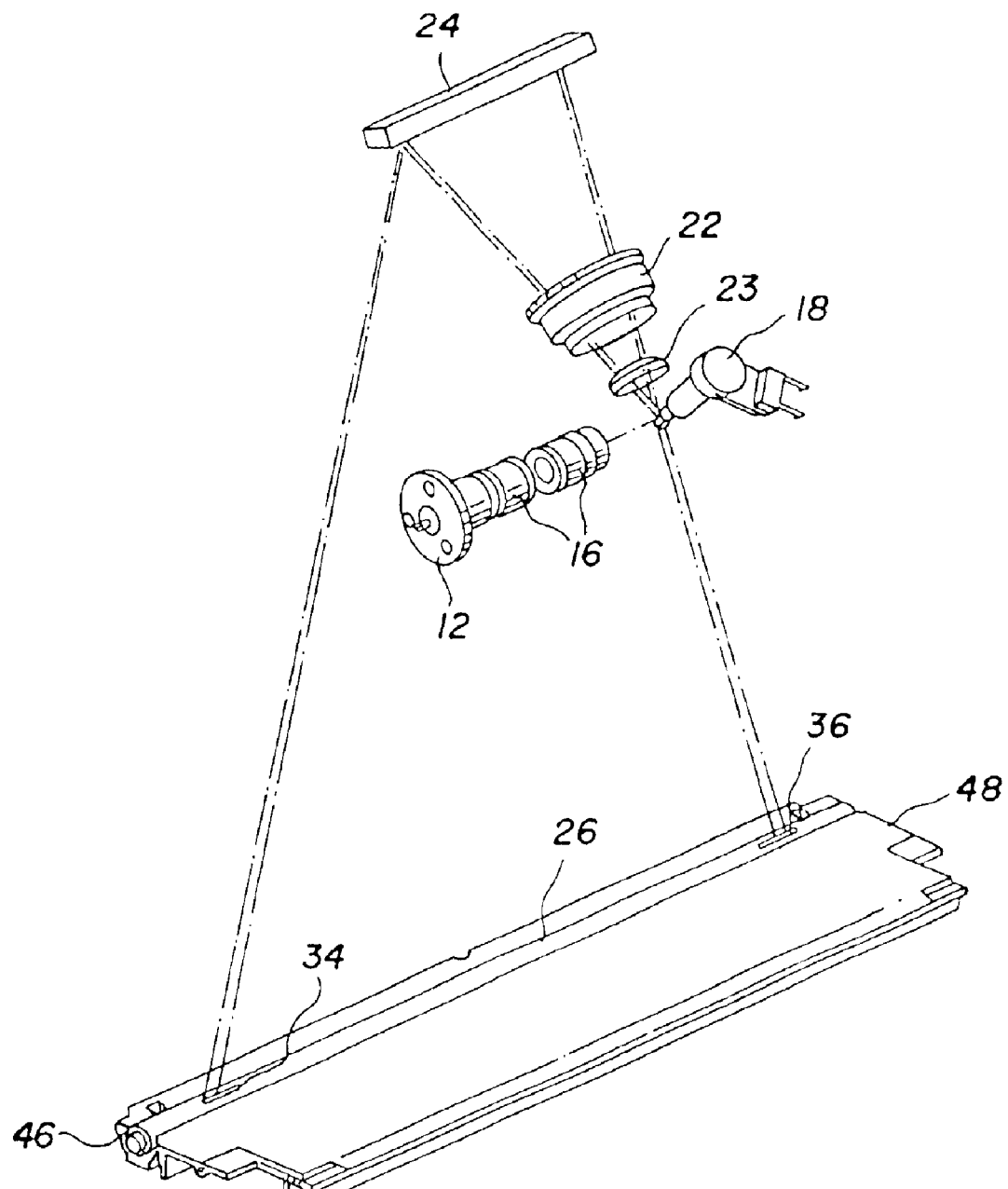
FIG. 4 is a diagrammatic view which shows the scan platen mounted in a storage phosphor guide plate.
Figure 5:
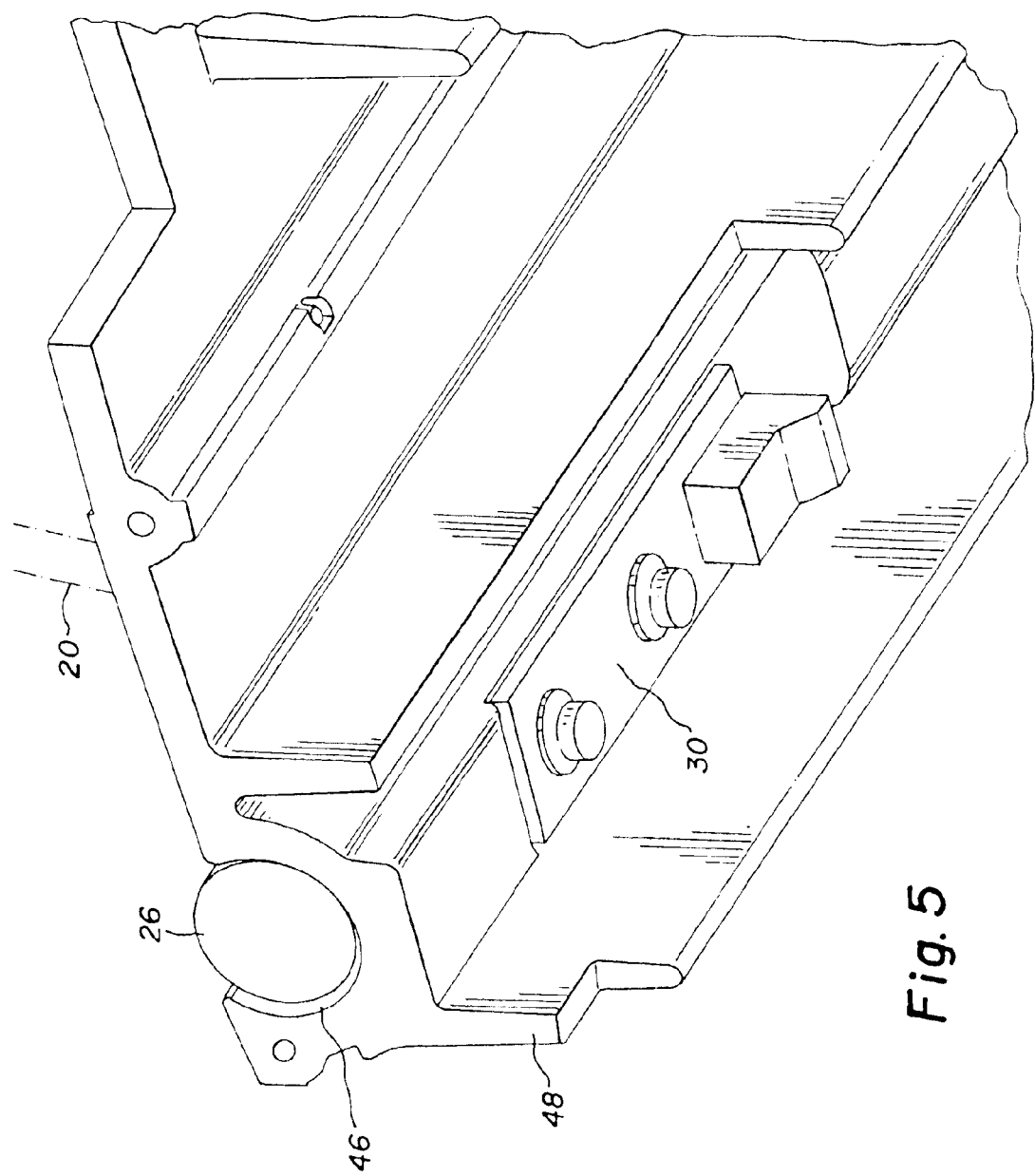
FIG. 5 is a diagrammatic view showing the underside of the guide plate of FIG. 4.
Figure 6:
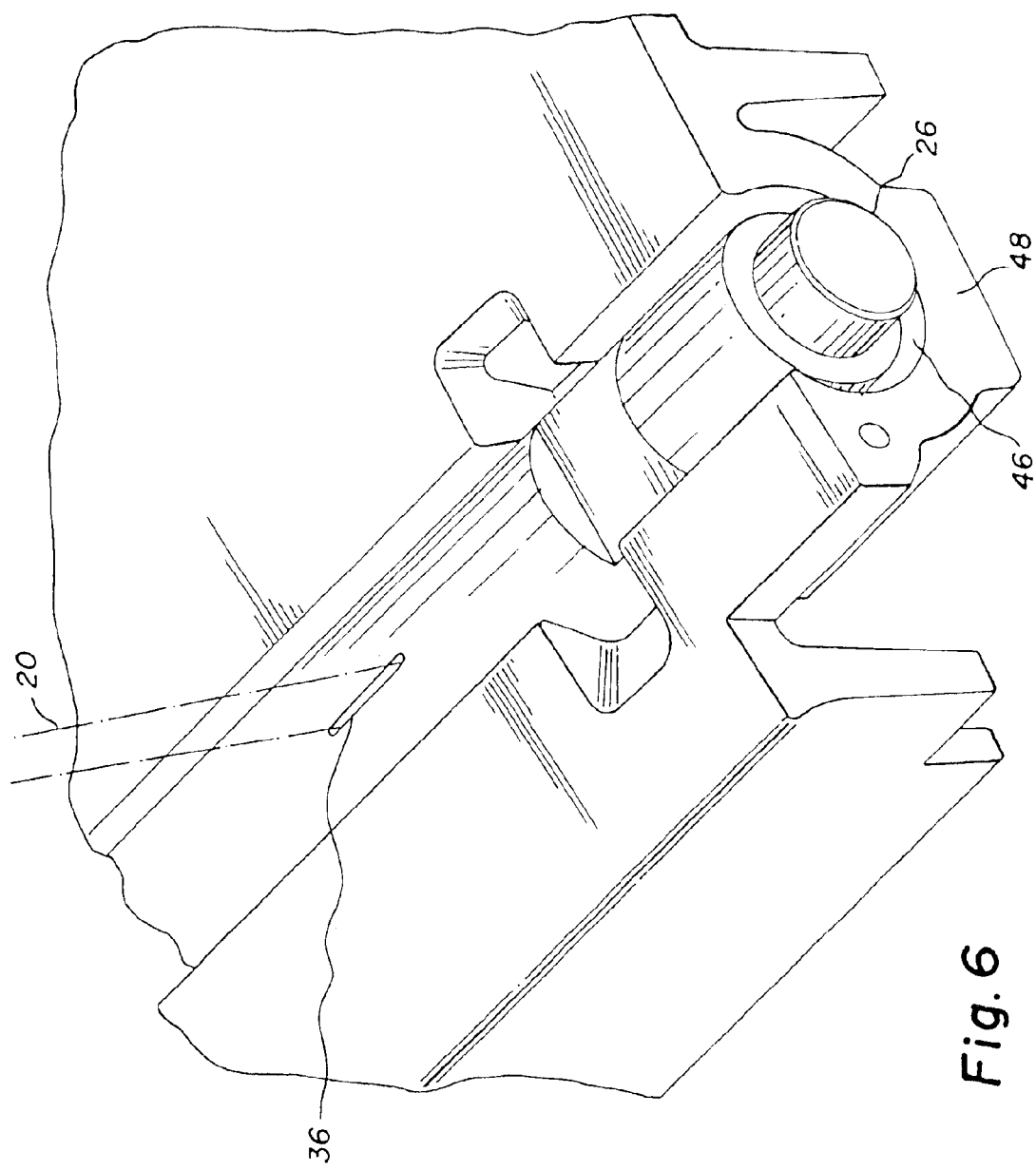
FIG. 6 is a diagrammatic view showing the scan platen recessed in the guide plate of FIG. 4.
Figure 7:
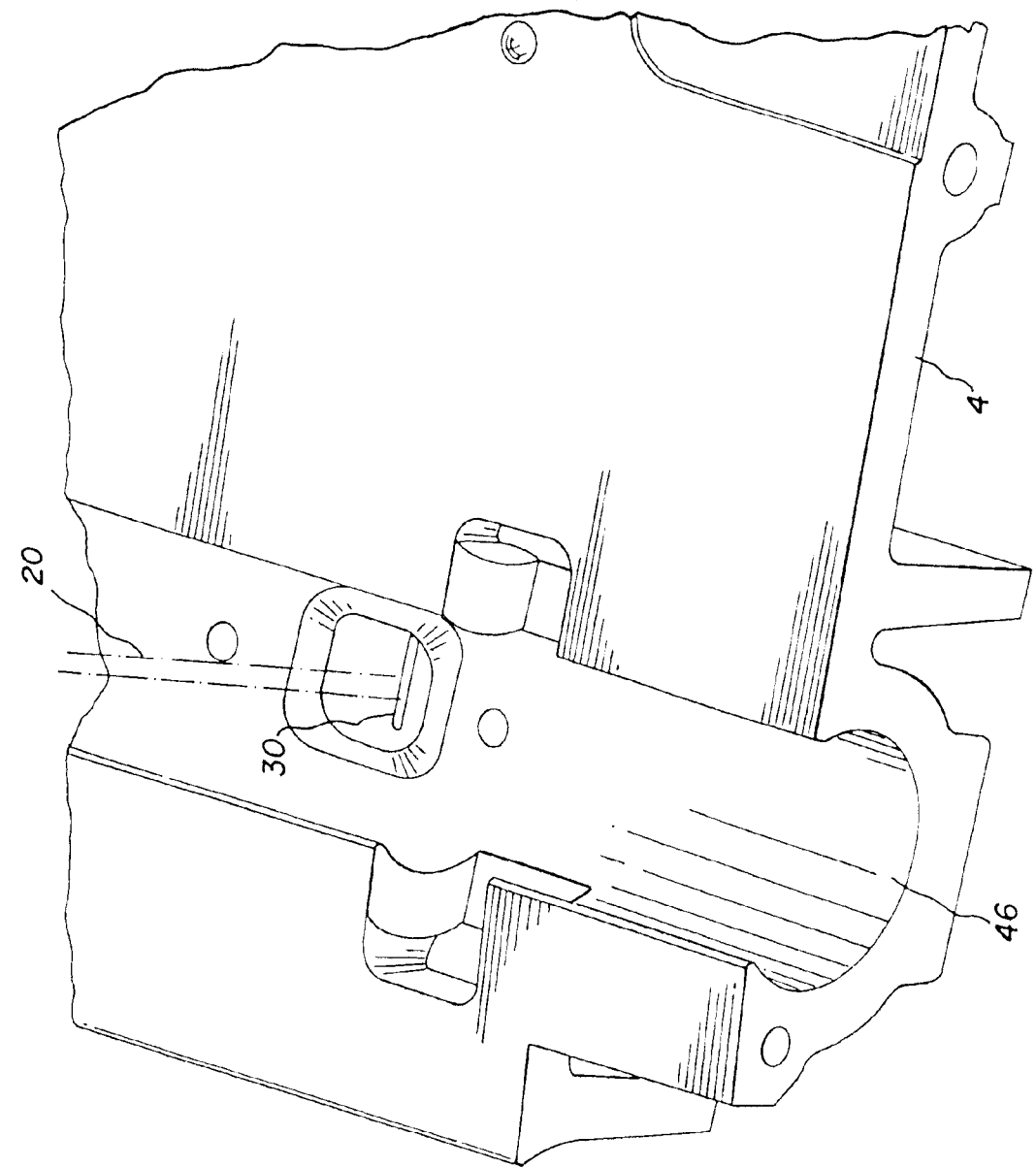
FIG. 7 is a diagrammatic view similar to FIG. 6 showing the scan platen removed.

FIG. 4 shows scan platen 26 mounted in a channel 46 of storage phosphor guide plate 48. FIG. 5 shows sensor 30 mounted on the underside of guide plate 48. FIGS. 6 and 7 show scan platen 26 recessed in channel 46 of guide plate 48 so that as a storage phosphor slides across guide plate 48 and scan platen 26, the storage phosphor does not contact slots 34, 36 thus avoiding build up of debris in slots 34, 36 and consequent degrading of the sensed laser beam.

Figure 8:
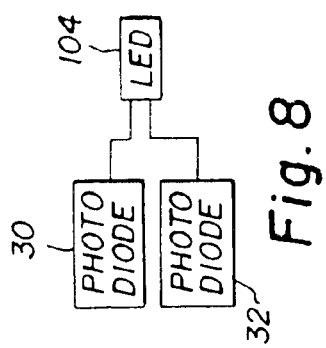
FIG. 8 is a schematic diagram of another embodiment of the invention.

FIG. 8 shows another embodiment of the invention in which photodiodes 30, 32 are connected to a multicolor LED which emits light of a different color for each photodiode 30, 32.

The invention has been described in detail with particular reference to certain preferred embodiments thereof, but it will be understood that variations and modifications can be effected within the spirit and scope of the invention.

PARTS LIST

10 laser scanning optical system
12 laser diode
14 laser beam
16 shaper lens element
18 galvonometer mirror
20 laser beam scan line
21 fast scan direction
22 F-theta lens
23 lens
24 final fold mirror
26 platen
28 slow scan direction
30 sensor
32 sensor
34 slit
36 slit
40 x-axis
42 y-axis
44 z-axis
46 channel
48 storage phosphor guide plate
100 light emitting diode (LED)
102 light emitting diode (LED)
104 multicolor LED

What is claimed is:

1. An optical imaging system comprising:

an optical assembly for producing a laser beam scanline at an imaging region;

first and second photodetectors located at said imaging region at the first and second ends of a produced laser beam scanline; and a visual indicator system coupled to said first and second photodetectors to visually indicate detection of said first and second ends of said laser beam scanline.

2. The system of claim 1 wherein said optical assembly includes a laser diode for producing a laser beam, first movable mirror assembly for scanning said laser beam in said laser beam scanline and a second elongated planar mirror spaced from said laser diode and from said imaging region for directing said laser beam scanline to said imaging region.

3. The system of claim 2 wherein said first movable mirror includes one of a reciprocatable galvonometer mirror and a rotatable multifaceted polygon mirror.

4. The system of claim 1 wherein said photodetectors are photodiodes.

5. The system of claim 1 wherein said visual indicator system includes light emitting diodes (LEDs) coupled to each photodetector.

6. The system of claim 5 wherein said LEDs emit light of different colors.

7. The system of claim 1 wherein said visual indicator system includes a single multicolor LED which is connected to said first and second photodetectors and which emits a different color light for each said first and second photodetectors.

8. The system of claim 1 wherein said imaging region includes a scan platen for supporting a storage phosphor to be scanned and including slots in said platen at the ends of said scan line behind which said photodetectors are positioned.

9. The system of claim 8 includes a storage phosphor guide plate, wherein said scan platen is mounted in a relieved portion of said storage phosphor guide plate and wherein said slots are positioned in a relieved area of said platen so that a storage phosphor plate sliding across said scan platen does not contact said slots, minimizing buildup of debris in said slots.

* * * * *